(12) United States Patent
Itani et al.

(10) Patent No.: US 9,279,491 B2
(45) Date of Patent: Mar. 8, 2016

(54) RESIN GEAR, AND METHOD AND APPARATUS FOR PRODUCING THE SAME

(75) Inventors: Shizuo Itani, Toyota (JP); Shigeo Shinozaki, Toyota (JP)

(73) Assignee: NIPPON GASKET CO., LTD., Toyota-shi, Aichi (JP)

( * ) Notice: Subject to any disclaimer, the term of this patent is extended or adjusted under 35 U.S.C. 154(b) by 322 days.

(21) Appl. No.: 13/816,622

(22) PCT Filed: Aug. 11, 2011

(86) PCT No.: PCT/JP2011/068351
§ 371 (c)(1),
(2), (4) Date: Feb. 12, 2013

(87) PCT Pub. No.: WO2012/029525
PCT Pub. Date: Mar. 8, 2012

(65) Prior Publication Data
US 2013/0139630 A1    Jun. 6, 2013

(30) Foreign Application Priority Data
Sep. 3, 2010  (JP) ................................. 2010-198123

(51) Int. Cl.
*F16H 55/06*  (2006.01)
*B29C 43/18*  (2006.01)
*B29D 15/00*  (2006.01)
*B29C 70/46*  (2006.01)
*B29C 70/86*  (2006.01)
B29L 15/00   (2006.01)
*F16H 55/17*  (2006.01)

(52) U.S. Cl.
CPC ............... *F16H 55/06* (2013.01); *B29C 43/18* (2013.01); *B29C 70/46* (2013.01); *B29C 70/86* (2013.01); *B29D 15/00* (2013.01); *B29L 2015/003* (2013.01); *F16H 55/17* (2013.01); *F16H 2055/065* (2013.01); *Y10T 74/1987* (2015.01)

(58) Field of Classification Search
CPC ... F16H 55/06; F16H 2055/065; B29D 15/00; B29C 43/18; B29C 70/46
See application file for complete search history.

(56) References Cited

U.S. PATENT DOCUMENTS 1,466,236 A * 8/1923 Stanley ........................... 74/445
4,339,490 A * 7/1982 Yoshioka et al. ............. 428/213

FOREIGN PATENT DOCUMENTS

| JP | 56-164276 | * 12/1981 |
| JP | 57-006154 | 1/1982 |
| JP | 63-059254 | 4/1988 |
| JP | 01-112075 | 4/1989 |
| JP | 06-210756 | 8/1994 |

(Continued)

OTHER PUBLICATIONS

International Search Report for PCT/JP2011/068351 (2 pgs.).

*Primary Examiner* — William C Joyce
(74) *Attorney, Agent, or Firm* — Flynn, Thiel, Boutell & Tanis, P.C.

(57) ABSTRACT

Gear-shaped resin sheets Sa are laminated such that tooth portions 2b are aligned in an axial direction, thereby preparing a spur gear-shaped net-shape body 4.
Tooth portions of the resin gear formed in a lower die 12 are pressed in a helical tooth-shaped molding space to deform the tooth portions 4a of the net-shape body 4 into a helical tooth tilted relative to the axial direction, and the direction of reinforcement fibers at the tooth portions 2b of the molded resin gear 1 is tilted relative to the axial direction.

4 Claims, 4 Drawing Sheets

(56) References Cited  * cited by examiner

FOREIGN PATENT DOCUMENTS

| | | |
|---|---|---|
| JP | 11-227061 | 8/1999 |
| JP | 2009-039966 | 2/2009 |
| JP | 2009-154338 | 7/2009 |

PRESS-IN DIRECTION

RESIN GEAR, AND METHOD AND APPARATUS FOR PRODUCING THE SAME

TECHNICAL FIELD

The present invention relates to resin gears, and methods and apparatuses for producing them, in particular to a resin gear, which is produced by cutting a resin sheet produced by sheet making into a gear shape, preparing a gear-shaped net-shape body by laminating a plurality of the gear-shaped resin sheets in an axial direction, and molding the net-shape body by heat and compression; and a method and an apparatus for producing it.

BACKGROUND ART

Conventionally, known is a method for producing a resin gear, which includes: cutting a resin sheet produced by sheet making into a gear shape; preparing a gear-shaped net-shape body by laminating a plurality of the gear-shaped resin sheets in an axial direction; and thereafter, molding the net-shape body by heat and compression (Patent Literature 1).

In accordance with this Patent Literature 1, for forming the above resin gear in a helical gear shape, teeth of the above gear-shaped resin sheets are gradually displaced and laminated, a helical gear-shaped net-shape body is prepared, and thereafter, the helical gear-shaped net-shape body is heated and compressed, so that a resin gear is molded (see paragraph 0037).

In addition, an apparatus for producing a resin gear in the above Patent Literature 1 is composed of upper and lower dies, which is so-called a cavity-core mold. For forming a resin gear in a helical gear shape, it is necessary to gradually displace and laminate teeth of the gear-shaped rein sheets in the lower die, and heat and compress them (see paragraphs 0031 and 0037).

Meanwhile, when a resin gear is prepared by laminating a plurality of resin sheets produced by sheet making in an axial direction, fibers are not entangled with each other in a direction of reinforcement fiber, and it is pointed out that resins are peeled off along this reinforcement fiber direction (Conventional Art of Patent Literature 2).

PRIOR ART DOCUMENTS

Patent Literature

Patent Literature 1: Japanese Patent Laid-Open No. 11-227061
Patent Literature 2: Japanese Patent Laid-Open No. 2009-154338

SUMMARY OF INVENTION

Problems to be Solved by the Invention

Here, in the case of a resin gear produced by the method of Patent Literature 1, the direction of reinforcement fiber is perpendicular to the axial direction when a net-shape body is prepared, so the direction of reinforcement fiber at each tooth is also perpendicular to the axial direction.

In contrast, a load applied on each tooth of a helical gear is applied in a direction perpendicular to a tooth surface of each tooth, so the load works in a tilt direction relative to the direction of reinforcement fiber. As pointed out in Patent Literature 2, there has been a problem that resins are peeled off along the direction of reinforcement fiber.

Further, in the case of an apparatus for producing a resin gear in Patent Literature 1, teeth of the gear-shaped resin sheets have to be gradually displaced and laminated in the lower die and this is a problem that the production process becomes cumbersome.

In view of these problems, the present invention provides a resin gear that can prevent peeling off of resins at helical tooth-shaped teeth and a method for producing it, and a resin gear-producing apparatus suitable for producing such resin gear.

Means for Solving the Problems

That is, a resin gear according to the invention is a resin gear prepared by making gear-shaped resin sheets by dispersing a thermosetting resin and a reinforcement fiber in a liquid; laminating a plurality of gear-shaped resin sheets in an axial direction; and heating and compressing them, which is characterized in that tooth portions of the resin gear are helical teeth tilted relative to the axial direction, and the direction of the reinforcement fiber at each tooth portion is tilted relative to the axial direction.

Further, a method for producing a resin gear according to the invention is a method for producing a resin gear, which includes: making a resin sheet by dispersing a thermosetting resin and a reinforcement fiber in a liquid and cutting the resin sheet in a gear shape; laminating a plurality of the gear-shaped resin sheets in an axial direction to prepare a gear-shaped net-shape body; and heating and compressing the gear-shaped net-shape body to mold the resin gear, which is characterized in that:

the gear-shaped resin sheets are laminated so that tooth portions are aligned in the axial direction and the net-shape body is prepared in a spur gear shape; and in heating and compressing the net-shape body, while each tooth portion is deformed into a helical tooth shape tilted relative to the axial direction, the direction of reinforcement fiber at each tooth portion is tilted relative to the axial direction.

Then, a resin gear production apparatus according to the invention is an apparatus for producing a resin gear comprising lower and upper dies for molding the resin gear by heating and compressing in an axial direction, a gear-shaped net-shape body prepared by laminating a plurality of gear-shaped resin sheets in the axial direction, which is characterized in that:

a net-shape body holder formed with a spur gear-shaped holding space for accommodating the net-shape body is provided between the lower and upper dies;

a molding space formed so that the tooth portions of the resin gear have a helical tooth shape is formed in the lower die, and the upper die has a spur gear-shaped pushing member, which is inserted into the holding space in the net-shape body holder for pushing the net-shape body from above; and when the net-shape body holder sets the net-shape body at a position adjacent to one end face of the molding space of the lower die, the pushing member of the upper die is inserted into the holding space of the net-shape body holder to push the net-shape body in the axial direction and the tooth portions of the net-shape body are deformed from a spur gear tooth to a helical gear tooth while being pressed in the molding space.

Advantageous Effects of Invention

According to the invention, even when teeth of a resin gear are helical gear teeth tilted relative to the axial direction, the direction of reinforcement fiber at each helical gear tooth can be tilted relative to the axial direction.

As a result, even when a load is applied in a direction perpendicular to a tooth surface, a load for peeling off along the direction of reinforcement fiber can be reduced, so that peeling off of resin at helical tooth-shaped tooth portions can be prevented.

Then, according to the invention, a spur gear-shaped net-shape body may be stored in the net-shape body holder. Thus, the net-shape body can be easily set in the production apparatus. Thereafter, heating and compressing the net-shape body can result in molding of a helical gear-shaped resin gear when the net-shape body is pressed in the molding space of the lower die.

When the resin gear is produced by this production apparatus, tooth portions of the net-shape body is pressed in the helical tooth-shaped molding space while being deformed in a tilting manner. Thus, the direction of reinforcement fiber is tilted relative to the axial direction, and thus, this apparatus is suitable for producing the resin gear. Further, the resin gear production method may be applied thereto.

MODE FOR CARRYING OUT THE INVENTION

Figure 1:
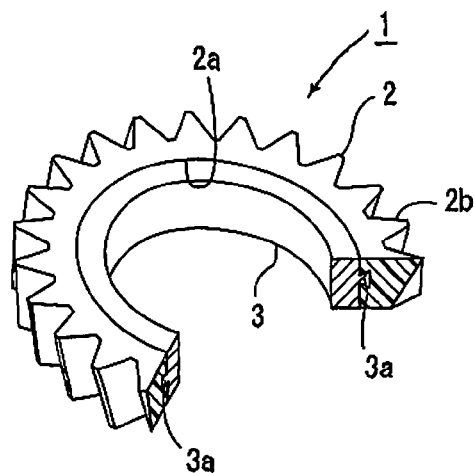
FIG. 1 is a perspective view of a resin gear according to the present embodiment.
Figure 2:
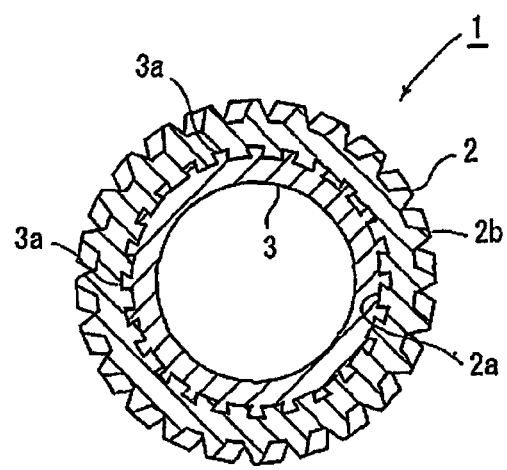
FIG. 2 is a circumferential cross sectional view of a resin gear.
Figure 3:
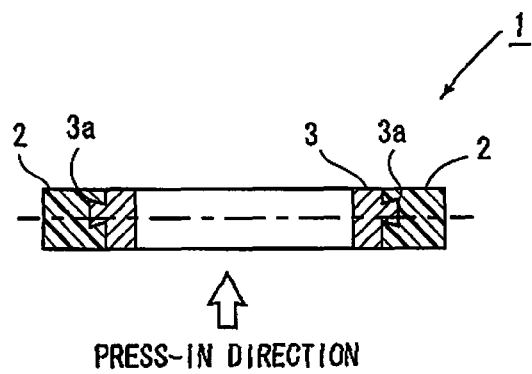
FIG. 3 is an axial cross sectional view of a resin gear.

Hereinafter, an embodiment shown in the figures is described. FIGS. 1 to 3 show a resin gear 1 used for a balancer shaft gear of an engine or the like. FIGS. 1 is a perspective view of a resin gear 1. FIG. 2 is a circumferential cross sectional view taken on a plane perpendicular to a central axis of the resin gear 1. FIG. 3 is an axial cross sectional view taken on a plane parallel to an axial direction.

The resin gear 1 is composed of a ring-shaped resin ring 2 and a metal bush 3 engaged with an inner peripheral surface 2a of the resin ring 2, and helical tooth-shaped tooth portions 2b formed so as to tilt relative to the axial direction are formed equidistantly on an outer periphery of the resin ring 2.

The metal bush 3 is made of a sintered alloy or a carbon steel. As shown in FIG. 2, the metal bush 3 has projections 3a formed on an outer periphery thereof as anti-rotation means and the resin ring 2 surrounds each projection 3a, and thereby, the resin ring 2 and the metal bush 3 are combined with each other with no rotation therebetween.

The projections 3a are provided in a line along the outer periphery of the metal bush 3, and formed in a reverse tapered shape so as to widen their shape toward an outside from the outer periphery of the metal bush 3. Then, the projections 3a of this embodiment provided at positions biased to one end surface of the metal bush 3 relative to an axial center of the metal bush 3.

Although described below in detail, a method for producing the resin gear 1 having the above construction is briefly explained using FIG. 4. First, a resin sheet S obtained by dispersing phenol resin powder, aramid fiber and the like in water and making the dispersion into a sheet, is cut into a gear shape (FIG. 4(a)), and a plurality of the gear-shaped resin sheets S are laminated and molded into a spur gear-shaped net-shape body 4 (FIG. 4(b)).

Thereafter, the net-shape body 4 is compression-molded into a helical gear-shaped resin ring 2 while being heated using a production apparatus 11 described below. At that time, the resin ring 2 is pressed into the metal bush 3 (FIG. 4(c)).

Figure 5:
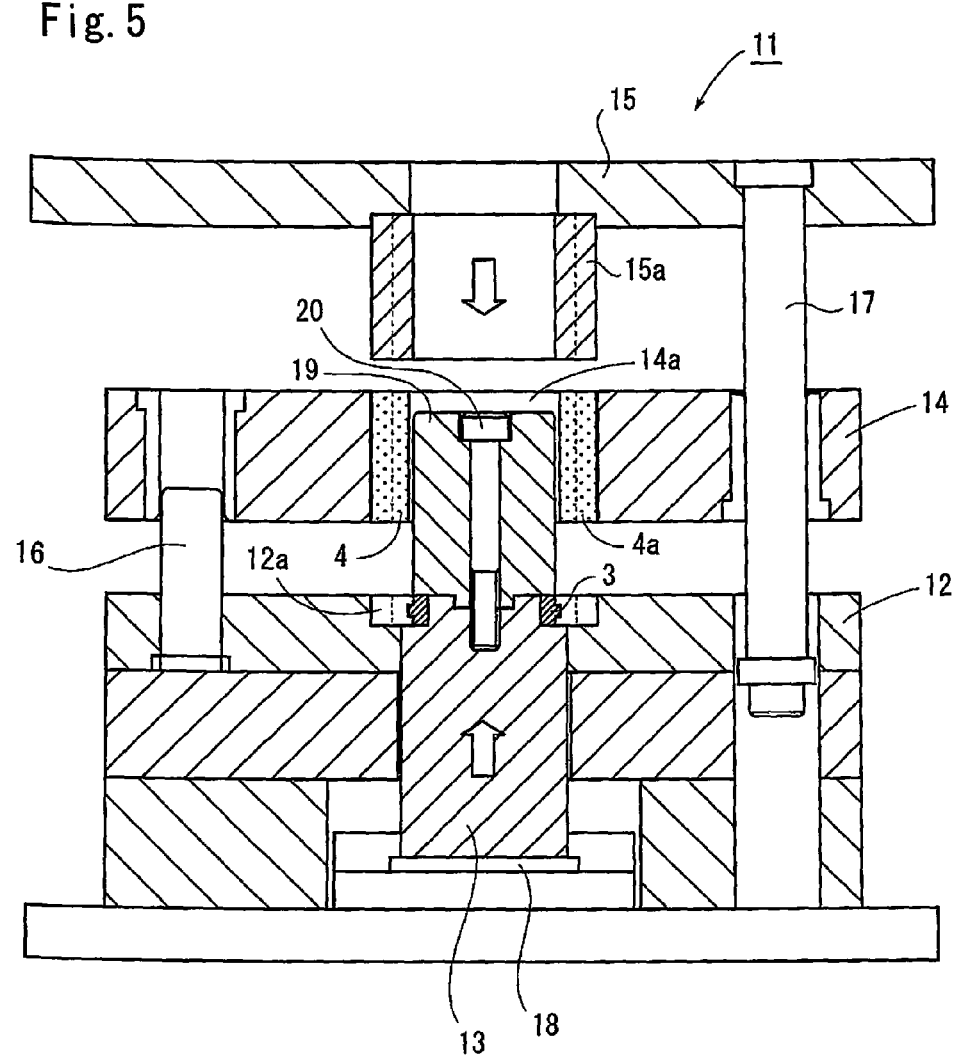
FIG. 5 is a cross sectional view of a production apparatus.
Figure 6:
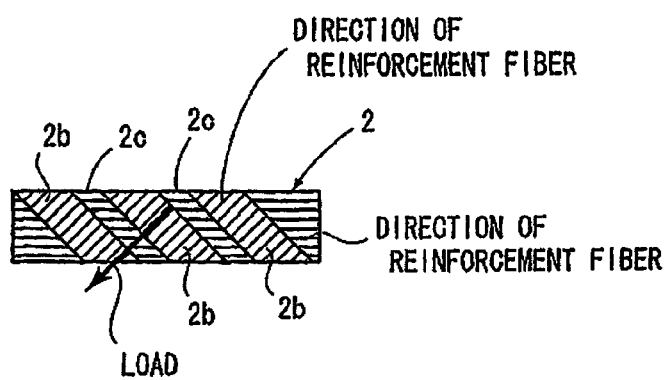
FIG. 6 is a drawing indicating a direction of a resin of a resin gear according to the present invention.

FIG. 5 shows a production apparatus 11 for the resin gear 1. The production apparatus 11 has a lower die 12 formed with a molding space 12a for molding the resin gear 1; a metal bush holder 13 for holding the metal bush 3; a net-shape body holder 14 for holding the net-shape body 4; and an upper die 15 for pushing the net-shape body 4 from above and pressing into the molding space 12a of the lower die 12, and further has a heater, not shown, for heating the net-shape body 4.

The lower die 12 is fixed to a main body portion and has on its upper surface an opening of the molding space 12a for pressing the net-shape body 4 and molding the resin gear 1. The metal bush holder 13 is for holding the metal bush 3 at the center of the molding space 12a.

In an outer peripheral portion (outside the broken line shown in the figure) of the molding space 12a, tilting spaces are formed so that the tooth portions 2b of the resin gear 1 have a helical tooth shape. The tooth portions 4a of the net-shape body 4 are inserted in a tilting manner along this space.

Further, the molding space 12a has a metal plated inner peripheral surface so that the molded resin gear 1 can be easily released from the lower die 12.

Then, a pin 16 for guiding the net-shape body holder 14 is provided upward and further, a through hole for inserting a pin 17 provided downward from the upper die 15 is provided at respective positions spaced from the molding space 12a in the lower die 12.

The metal bush holder 13 has a generally cylindrical shape and has on its top end a level difference formed to be in contact with a lower surface of the metal bush 3 and in engagement with the inner peripheral surface of the metal bush 3 in order to hold the metal bush 3 at a position of the molding space 12a of the lower die 12.

The metal bush holder 13 has an outer periphery with a diameter beyond positions of the projections 3a of the metal bush 3 and within base portions (broken line in the figure) of the tooth portions 2b of the resin ring 2.

The metal bush holder 13 is provided so as to elevate, while rotating, relative to the lower die 12 by elevating means 18. When it rotates and moves up from a down position shown in FIG. 4, it pushes the metal bush 3 and the inner side of the tooth portions 2b of the resin ring 2 in the resin gear 1 from below to release the resin gear 1 from the molding space 12a formed in the helical gear shape.

Next, the cylindrical guide member 19 is removably provided by a bolt 20 in an upper part of the metal bush holder 13. The guide member 19 is joined to the metal bush holder 13 after the metal bush 3 is mounted on the metal bush holder 13.

Then, the guide member 19 is molded with the same diameter as that of the outer peripheral surface of the metal bush 3, or that of the inner peripheral surface 4b of the net-shape body 4. When the guide member 19 is mounted on the metal bush holder 13, the upper end surface of the metal bush 3 is covered with the guide member 19.

When the net-shape body 4 is pressed into the molding space 12a of the lower die 12, this prevents resin from being getting in between the guide member 19 and the metal bush 3.

The net-shape body holder 14 has a holding space 14a for accommodating the net-shape body 4 at its center, and moves up and down by the elevating means 18.

The holding space 14a is a spur gear-shaped space for accommodating the net-shape body 4, and tooth portions 4a of the accommodated net-shape body 4 are positioned so as to agree with the shape of a gear-shaped opening exposed on the upper surface of the molding space 12a formed in the lower die 12.

In addition, when the net-shape body holder 14 is moved down, the guide member 19 is positioned at the center of the holding space 14a. This allows the holding space 14a to have a space with generally the same shape as the net-shape body 4.

Further, the net-shape body holder 14 is formed with a through hole, into which the pin 16 provided to the lower die 12 is inserted, and a through hole, into which a pin 17 provided to the upper die 15 is inserted. These prevent a position gap among the lower die 12, the net-shape body holder 14 and the upper die 15.

The upper die 15 moves up by elevating means not shown, and has a pushing member 15a, which is inserted in the holding space 14a formed by the net-shape body holder 14 and the guide member 19.

On an outer peripheral surface of the pushing member 15a, spur gear-shaped tooth portions are formed like the net-shape body 4. When the pushing member 15a is inserted into the holding space 14a formed in the net-shape body holder 14, a lower surface of the pushing member 15a pushes the net-shape body 4 from above.

Then, the net-shape body holder 14 and the upper die 15 are lowered to a down end, a lower end portion of the pushing member 15a stops at a position of an upper surface of the lower die 12. This allows the net-shape body 4 to be pressed into the molding space 12a of the lower die 12.

Figure 4:
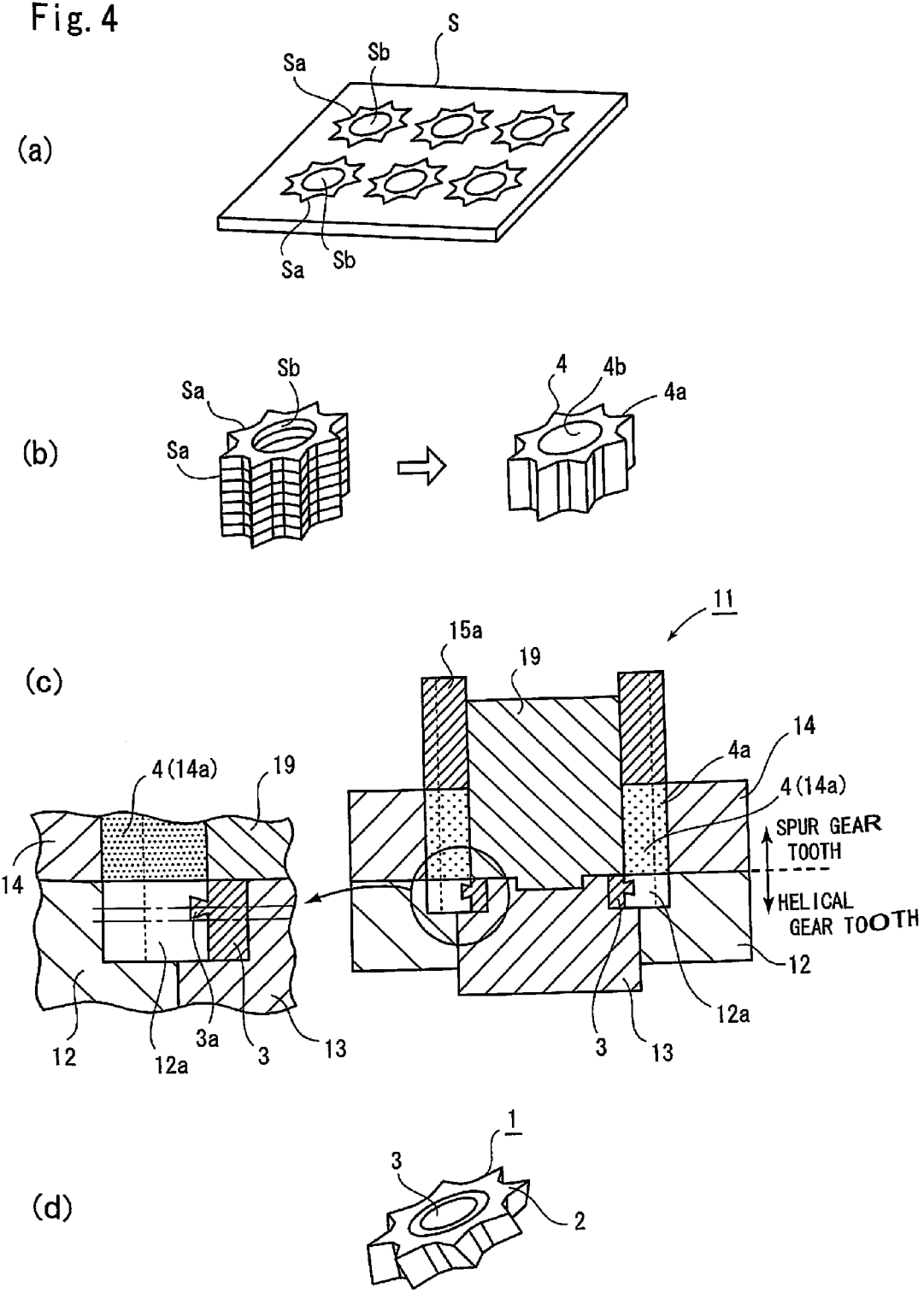
FIG. 4 is a drawing explaining a method for producing a resin gear.

Next, a production method of the resin gear 1 is described using FIG. 4.

First, FIG. 4(*a*) shows a process wherein a resin sheet S is produced by sheet making and the resin sheet s is cut into a gear shape.

Initially, phenol resin powder as a thermosetting resin, aramid fiber as a reinforcement fiber, and aramid pulp are each dispersed in water, and this dispersion is used for sheet making to prepare a rectangular resin sheet S. The obtained sheet is put into a pressing machine for dewatering.

From the thus obtained resin sheet S, a plurality of gear shapes can be obtained. The rectangular resin sheet S is put into a press-cutting machine, and thereby a plurality of gear-shaped resin sheets Sa can be obtained. At this time, a circular hole Sb constituting the inner peripheral surface 2a is made in each resin sheet Sa.

It should be noted that remaining materials generated at this time may be used again for making the above resin sheet S by recycling.

Thereafter, moisture is removed from the obtained gear-shaped resin sheet Sa by means such as drying.

Next, FIG. 4(*b*) shows a process wherein a plurality of the gear-shaped resin sheets Sa are laminated and molded into the net-shape body 4.

In this embodiment, eight resin sheets S are laminated. At this time, they are laminated in such a state that teeth of each resin sheet S are positioned to agree with those of other sheets. The resultant laminated sheets are input into a mold, not shown, for constraining inner and outer peripheral shapes, and compressed in an axial direction or a lamination direction while being heated at a temperature for softening phenol resin.

Then, the aramid fiber contained in the resin sheet S faces in a horizontal direction by compression, and adjacent resin sheets S are bonded to each other by partially softening phenol powder. As a result of that, a spur gear-shaped net-shape body 4 is obtained which has spur gear-shaped tooth portions 4a formed on an outer periphery and has a circular inner peripheral surface 4b formed therein.

This net-shape body 4 is formed to have an axial thickness larger than that of the metal bush 3, but the diametrical dimensions are rarely different from the resin gear 1 after molding. In particular, the diameter of the inner peripheral surface 2a is the same as that of the outer peripheral surface of the metal bush 3.

Then, FIG. 4(*c*) shows a process for pressing the net-shape body 4 into the metal bush 3 while heating and pressurizing by using the production apparatus 11 shown in FIG. 4, and combining the resin ring 2 with the metal bush 3.

First, the metal bush 3 is mounted on the metal bush holder 13, thereafter, the guide member 19 is joined to the metal bush holder 13, and the metal bush 3 is sandwiched so that the upper and lower end surfaces thereof are covered.

In addition, the metal bush holder 13 holds the lower end surface of the metal bush 3 at a height of the molding space 12a formed in the lower die 12, and the upper end surface of the metal bush 3 is positioned at the same height as the upper surface of the lower die 12. At this time, the projections 3a of the metal bush 3 are biased upward relative to the central line.

Meanwhile, when the net-shape body 4 is set in the net-shape body holder 14, the net-shape body holder 14 is lowered to such a position as to be in contact with the lower die 12, so that the net-shape body 4 is set up to a position adjacent to the upper end face of the molding space 12a of the lower die 12 and the guide member 19 is inserted into an inner peripheral surface 4b of the net-shape body 4.

At this time, since the net-shape body 4 has spur gear-shaped tooth portions 4a formed thereon, it does not enter the molding space 12a formed in a helical gear shape.

Subsequently, the net-shape body 4 held in the net-shape body holder 14 is heated by a heater. When the net-shape body 4 is heated to a predetermined temperature, phenol powder contained in the net-shape body 4 is once softened.

In this state, when the upper die 15 is lowered, the pushing member 15a is inserted into the holding space 14a formed between the net-shape body holder 14 and the guide member 19, and the net-shape body 4 is pressed downward by the pushing member 15a.

As a result of that, the softened net-shape body 4 is pressed into the molding space 12a of the lower die 12, and the thickness of the net-shape body 4 is compressed to that of the resin ring 2. Further, the spur gear-shaped tooth portions 4a are deformed along the molding space 12a, so that helical tooth-shaped tooth portions 2b are molded.

Further, when the net-shape body 4 is pushed downward by the pushing member 15a, the metal bush 3 is pressed from below in the inner peripheral surface 4b of the net-shape body 4. At that time, projections 3a formed on the metal bush 3 pushes away the softened resin of net-shape body 4, and the resin goes around a space formed after the projections 3a thrust the resin.

When the net-shape body 4 is compressed and pressed in the molding space 12a in this way, the resin of net-shape body 4 filled in the lower die 12 becomes solidified by crosslinking reaction, providing the resin ring 2. Thus, a resin gear 1 having the metal bush 3 mounted in an inner periphery of the resin ring 2 is obtained.

Thereafter, the upper die 15 and the net-shape body holder 14 are elevated and removed from the lower die 12, and further later, the metal bush holder 13 is rotated and moved up by the elevating means 18, so that the resin gear 1 is released from the lower die 12.

Then, in FIG. 4(d), the resin gear 1 obtained by the above process is annealed by re-heating and finished by deburring, so that the resin gear 1 is obtained.

According to the production method of the resin gear 1 in the present embodiment, a spur gear-shaped net-shape body 4 having the gear-shaped resin sheets Sa laminated in an axial direction is formed in a helical gear shape by the production apparatus 11, and this enables the direction of aramid fiber at tooth portions 2b to be tilted relative to the axial direction.

To explain specifically, when a ring-shaped portion 2c of the resin ring 2 is molded by the production apparatus 11, it is pressed from the net-shape body 4 guide to the molding space 12a of the lower die 12 or from above to below without receiving a lateral pressure, and thus, the direction of aramid fiber keeps perpendicular to the axial direction.

In contrast, when being pressed in the molding space 12a, the tooth portions 2b of the resin ring 2 are deformed from spur gear teeth to helical gear teeth by twisting. Thus, when the direction of aramid fiber is deformed along the helical tooth-shaped molding space 12a, it is tilted relative to the axial direction, so that it faces a generally normal tooth relative to tooth surfaces of the helical tooth-shaped tooth portions 2b.

Then, a load worked on each tooth portion 2b of a helical gear is at a right angle relative to a tooth surface, and it works in generally the same direction as the direction of aramid fiber. Thus, a component force for peeling off resins in the direction of aramid fiber does not work, and this prevents resin at the tooth portions 2b from being peeled off.

Figure 7:
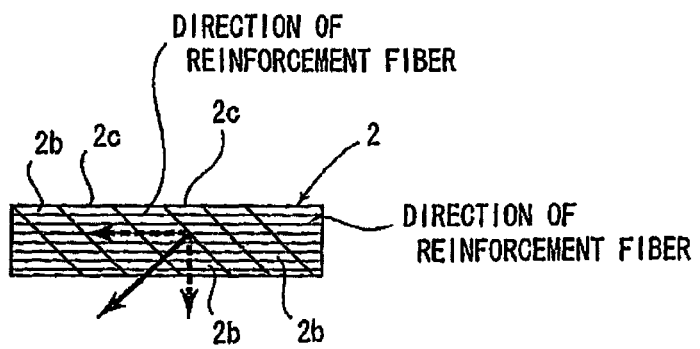
FIG. 7 is a drawing indicating a direction of a resin of a resin gear according to a conventional art.

In contrast, FIG. 7 shows a resin gear 1 produced by the production method of the Patent Literature 1. A net-shape body 4 is formed in a helical gear shape, and the net-shape body 4 is molded directly in a helical gear shape to provide the resin gear 1.

According to this production method, the net-shape body 4 having the helical tooth-shaped tooth portions 2b is directly pressed along a helical tooth-shaped space, so the direction of fiber at the tooth portions 2b remains perpendicular to the axial direction.

As a result, a load worked on each tooth portion 2b works in a tilting direction relative to the direction of fiber, and a component force works obliquely relative to the direction of fiber. Thus, peeling off may occur along the direction of fiber, which hardly has fiber entanglements.

Then, regarding the resin gear 1 produced by the production method of the present invention and the resin gear 1 produced by the production method of the Patent Literature 1, the torsion strength was measured at the tooth portions 2b.

Specifically, the torsion strength was evaluated by measuring the durability to a load worked in a direction perpendicular to a tooth surface of the tooth portion 2b. It was confirmed that a product of the present invention has higher load bearing property than a conventional product, and it was understood that peeling off is not likely to occur along the direction of fiber by a load worked on the tooth portions 2b.

REFERENCE SIGNS LIST

1 Resin rotating body
2 Resin ring
2a Inner peripheral surface
3 Metal bush
3a Projection
4 Net-shape body
11 Production apparatus
12 Lower die
12a Molding space
13 Metal bush holder
14 Net-shape body holder
14a Holding space
15 Upper die
15a Pushing member
19 Guide member

The invention claimed is:

1. A resin gear produced by laminating a plurality of gear-shaped resin sheets in an axial direction to form a gear-shaped net-shape body and molding the gear-shaped net-shaped body, the sheets being made by dispersing a thermosetting resin and a reinforcement fiber in a liquid; and heating and compressing the dispersion,
wherein the resin gear has a resin ring composed of a ring-shaped portion and a plurality of tooth portions on an outer periphery of the ring-shaped portion, the tooth portions being helical teeth tilted relative to the axial direction, and
the direction of a majority of reinforcement fiber in the ring shaped portion is perpendicular to the axial direction, and the direction of a majority of reinforcement fiber in the tooth portions is tilted relative to the axial direction and is of the same direction as a load applied on the tooth portions.

2. The resin gear according to claim 1, wherein the direction of the reinforcement fiber in the tooth portion is tilted almost perpendicular to a tooth surface of the tooth portion.

3. The resin gear according to claim 1, comprising a metal bush to be engaged with an inner peripheral surface of the resin ring,
wherein the metal bush has on an outer periphery, anti-rotation means for combining the resin gear and the metal bush with each other with no rotation therebetween.

4. The resin gear according to claim 3, wherein the anti-rotation means is composed of a large number of projections provided radially in a line along the outer periphery of the metal bush and formed in a reverse tapered shape so as to widen their shape toward an outside from the outer periphery of the metal bush, the projections in a line being further provided at positions biased to one end surface in an axial direction relative to an axial center of the metal bush.

\* \* \* \* \*